(12) United States Patent
Uyama et al.

(10) Patent No.: US 7,612,857 B2
(45) Date of Patent: Nov. 3, 2009

(54) LIQUID CRYSTAL DISPLAY

(75) Inventors: Nami Uyama, Ishikawa (JP); Hideya Kawashima, Ishikawa (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 10/499,301

(22) PCT Filed: Dec. 19, 2002

(86) PCT No.: PCT/JP02/13275

§ 371 (c)(1),
(2), (4) Date: Mar. 15, 2005

(87) PCT Pub. No.: WO03/052503

PCT Pub. Date: Jun. 26, 2003

(65) Prior Publication Data

US 2005/0157240 A1     Jul. 21, 2005

(30) Foreign Application Priority Data

Dec. 19, 2001 (JP) ............................. 2001-386188

(51) Int. Cl.
*G02F 1/1339* (2006.01)

(52) U.S. Cl. ................ 349/154; 349/153; 349/190

(58) Field of Classification Search ................ 349/153, 349/154, 190
See application file for complete search history.

(56) References Cited

U.S. PATENT DOCUMENTS 5,706,069 A * 1/1998 Hermens et al. ............ 349/153
5,933,209 A * 8/1999 Yonemoto ................... 349/153
6,118,509 A * 9/2000 Miyake ....................... 349/153
6,320,638 B1 * 11/2001 Youn .......................... 349/154
6,463,977 B1 * 10/2002 Youn .......................... 349/154
6,665,040 B2 * 12/2003 Youn .......................... 349/153
2002/0060768 A1 * 5/2002 Chung et al. ................ 349/139
2002/0149732 A1 * 10/2002 Youn .......................... 349/153

FOREIGN PATENT DOCUMENTS

JP          09-50038      2/1997
JP       P2001-215520      8/2001

* cited by examiner

*Primary Examiner*—David Nelms
*Assistant Examiner*—Nathanael R Briggs
(74) *Attorney, Agent, or Firm*—McDermott Will & Emery LLP

(57) ABSTRACT

A liquid crystal display device is provided which allows an ultraviolet curing sealant to be cured without blockage of ultraviolet rays by wiring formed of a conductive metal film and which ensures stabilized quality of reliability with the occurrence of defective image display inhibited. The liquid crystal display device is manufactured through a process including: bonding a liquid crystal driving substrate provided with wiring formed of a conductive metal film to its counter substrate; injecting a liquid crystal material into a clearance defined between the substrates through a liquid crystal material injecting portion; and then sealing the injecting portion with an ultraviolet curing sealant, the wiring being positioned so as not to overlap the interface between the liquid crystal material and the ultraviolet curing sealant in plan view.

7 Claims, 3 Drawing Sheets

LIQUID CRYSTAL DISPLAY

TECHNICAL FIELD

The present invention relates to a liquid crystal display device formed by bonding a pair of opposite substrates to each other, injecting a liquid crystal material into space between the substrates and sealing the injecting portion with an ultraviolet curing sealant.

BACKGROUND ART

With the increase in display panel size for liquid crystal display devices in these years, there is a demand for a reduction in the non-display area including a bonded portion at which the substrates are bonded to each other with an adhesive or the like. For this purpose, the device design tends to narrow the spacing between the substrate peripheral edge and the display area edge (hereinafter will be referred to as "frame-narrowing".)

FIG. 5 is a schematic plan view of the display panel of a conventional liquid crystal display device of frame-narrowing design, showing the configuration of wiring formed on a transparent substrate in the display panel. As shown in FIG. 5, the display panel of the liquid crystal device has an arrangement including wiring 4 formed of a conductive metal film, a substrate (hereinafter will be referred to as liquid crystal driving substrate) 1 formed on its internal surface with switching devices (not shown) each comprising a thin film transistor (TFT) for example, and a liquid crystal material layer 6 interposed between the liquid crystal driving substrate 1 and a counter substrate (not shown) facing the liquid crystal driving substrate 1. The liquid crystal driving substrate 1 and the counter substrate have their respective peripheral portions bonded to each other with an adhesive layer 5 except a region as a liquid crystal material injecting portion 2. The liquid crystal material layer 6 is formed by injecting a liquid crystal material into the space defined between the two substrates fixed to each other with the adhesive layer 5. Thereafter, an ultraviolet curing sealant 3 is applied to the liquid crystal material injecting portion 2 and then cured by irradiation with ultraviolet rays from the principal plane side of the display panel. Thus, the liquid crystal material injecting portion 2 is sealed.

In such a display panel the peripheral region in which the adhesive layer 5 is included and the wiring 4 positioned is an area (non-display area) c that does not participate in the display. A display area b is located as surrounded by the non-display area c. In a liquid crystal display device of frame-narrowing design, the non-display area c is reduced to enlarge the display area b. For this purpose, the wiring 4 is positioned on the side close to the peripheral edge of the display panel, and the interface a between the liquid crystal material layer 6 and the sealant 3 (hereinafter will be referred to as "liquid crystal-sealant interface a") is positioned also on the side close to the peripheral edge of the display panel. Though not shown here, the display area b comprises a plurality of pixels arranged in matrix and has a network of wiring associated with the pixels. For example, the wiring 4 serves as the so-called rescue wiring to be used when a break occurs in the network of wiring extending in the display area b.

In the aforementioned conventional liquid crystal display device of frame-narrowing design, ultraviolet rays for curing the sealant 3 may be blocked by the wiring 4 in the case where the sealant 3 has reached up to a region in which the wiring 4 is positioned due to materials, equipment or the like used in the manufacturing process. Particularly in a case where the wiring 4 is positioned at a location corresponding to the liquid crystal-sealant interface a at which the liquid crystal material layer 6 and the sealant 3 are in contact with each other, the wiring 4 formed of a metal material, which does not transmit ultraviolet rays, blocks ultraviolet rays for irradiation. For this reason, the sealant 3 in an uncured state is brought into contact with the liquid crystal material layer 6. Therefore, the liquid crystal material layer 6 is contaminated, which results in problems with the display device including the occurrence of defective image display, lowered yield and degraded quality in reliability and the like.

DISCLOSURE OF INVENTION

In order to solve the foregoing problems essential to the prior art, the present invention has an object to provide a liquid crystal display device which allows an ultraviolet curing sealant to be cured without blockage of ultraviolet rays for irradiation by wiring formed of a conductive metal film, that is, a liquid crystal display device which can inhibit the occurrence of defective image display and ensure a stabilized quality in reliability and the like.

To attain the aforementioned object, a liquid crystal display device according to the present invention comprises: a pair of substrates disposed with respective principal planes thereof facing each other to define a clearance therebetween, at least one of the substrates being formed with wiring of a metal material on an internal surface thereof; a liquid crystal material layer comprising a liquid crystal material filling the clearance between the pair of substrates; an adhesive layer enclosing the liquid crystal material layer except a gap as a liquid crystal material injecting portion in the clearance; and an ultraviolet curing sealant sealing the liquid crystal material injecting portion, wherein the wiring is positioned so as not to overlap an interface between the liquid crystal material layer and the sealant in a plan view of the substrates.

In this construction, the wiring does not overlap the interface between the liquid crystal material layer and the sealant in the aforementioned plan view and, hence, the interface can be irradiated with ultraviolet rays without blockage of the ultraviolet rays by the wiring in curing the sealant by irradiation with the ultraviolet rays from the principal plane side of the pair of substrates. It is, therefore, possible to cure the sealant present adjacent the interface reliably. For this reason, the liquid crystal material layer can be prevented from being contaminated with the sealant and, hence, it is possible to prevent occurrences of defective image display, lowered yield and degraded quality in reliability and the like.

In the aforementioned plan view, the wiring may be positioned closer to a peripheral edge of the pair of substrates than the aforementioned interface in the liquid crystal material injecting portion.

This arrangement can prevent the wiring from overlapping the interface in the plan view. Since the wiring is positioned closer to the peripheral edge of the pair of substrates than the interface, the wiring will not affect the display. Thus, a frame-narrowing design is possible.

It is possible that, in the plan view, the wiring extending throughout the liquid crystal material injecting portion and a region therearound is positioned closer to the peripheral edge of the pair of substrates than the wiring extending in any region other than the liquid crystal material injecting portion and the region therearound.

According to this arrangement, the wiring extending throughout the liquid crystal material injecting portion and the region therearound projects toward the peripheral edge of the pair of substrates from the wiring extending in any region other than those regions. Thus, the wiring can be prevented from overlapping the interface in the plan view.

It is possible that the wiring extending throughout the liquid crystal material injecting portion and the region therearound has a smaller line width than the wiring extending in any region other than the liquid crystal material injecting portion and the region therearound and that the thinner wiring is positioned closer to the peripheral edge of the pair of substrates than the aforementioned interface. Alternatively, the thinner wiring may be positioned closer to a display area formed by a collection of pixels comprising the pair of substrates and the liquid crystal material layer than the aforementioned interface.

With this arrangement in which the wiring extending throughout the liquid crystal material injecting portion and the region therearound has a smaller line width, it is possible to prevent the wiring from overlapping the interface in the aforementioned plan view. Since the wiring extending throughout the aforementioned regions, which is basically positioned so as not to affect the display area, has a decreased line width in this arrangement, the thinner wiring, whether it is positioned closer to the peripheral edge of the pair of substrates or to the display area than the aforementioned interface, will not affect the display. Further, since this arrangement does not need any space for a projecting wiring portion to be positioned therein, which is needed by the aforementioned arrangement having the wiring projected, this arrangement is effective in frame-narrowing.

It is possible that the wiring is branched into branch lines defining an opening therebetween in a region consisting of the liquid crystal material injecting portion and the region therearound while the aforementioned interface is positioned within the opening in the aforementioned plan view.

With this arrangement in which the wiring extending throughout the liquid crystal material injecting portion and the region therearound is branched to define an opening while the aforementioned interface is positioned within the opening, it is possible to prevent the wiring from overlapping the interface. Since the wiring, which is basically positioned so as not to affect the display area, is branched, the branch lines wiring will not affect the display. Further, this arrangement does not need any space for a projecting wiring portion to be positioned therein, which is needed by the aforementioned arrangement having the wiring projected. For this reason this arrangement is effective in frame-narrowing.

The foregoing and other objects, features and advantages of the present invention will become apparent from the following detailed description of the preferred embodiments with reference to the accompanying drawings.

BEST MODE FOR CARRYING OUT THE INVENTION

Hereinafter, embodiments of the present invention will be described with reference to the drawings.

Embodiment 1

Figure 1A:
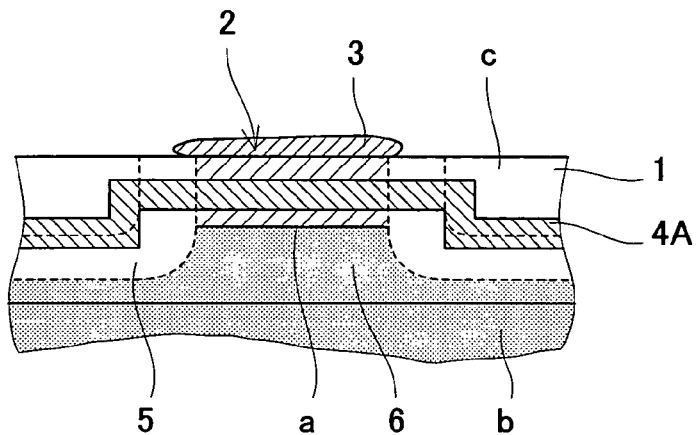
FIGS. 1A and 1B are each a schematic enlarged fragmentary plan view showing the configuration of wiring extending in a region around the liquid crystal material injecting portion of a display panel included in a liquid crystal display device according to embodiment 1 of the present invention.

FIG. 1A is a schematic enlarged fragmentary plan view showing the configuration of wiring extending in a region around the liquid crystal material injecting portion of a display panel included in a liquid crystal display device according to embodiment 1 of the present invention.

As shown in FIG. 1A, the display panel of the liquid crystal display device has an arrangement in which a liquid crystal driving substrate 1 is provided with wiring 4A of a conductive metal material on an internal surface thereof and a liquid crystal material layer 6 interposed between the liquid crystal driving substrate 1 and a counter substrate positioned to face the substrate 1. The liquid crystal driving substrate 1 and the counter substrate have respective peripheral portions bonded to each other with an adhesive layer 5 except a region as a liquid crystal material injecting portion 2. The liquid crystal material layer 6 is formed to comprise a liquid crystal material injected into a clearance between the two substrates through the liquid crystal material injecting portion 2. The liquid crystal material injecting portion 2 is sealed with an ultraviolet curing sealant 3. Accordingly, the liquid crystal material layer 6 and the sealant 3 form an interface therebetween, i.e. liquid crystal-sealant interface a, in the liquid crystal material injecting portion 2.

A wiring 4A comprising a film of metal such as Al and having a constant width is formed on the internal surface of the liquid crystal driving substrate 1 to extend along the periphery of the pair of substrates (the periphery of the liquid crystal driving substrate 1 in the figure.) In this embodiment a peripheral region in which the adhesive layer 5 is included and the wiring 4a positioned is a non-display area c which does not participate in the display. A display area b is formed as surrounded by the non-display area c. Accordingly, the display area b is enclosed with the wiring 4A. Though not shown here, the display area b comprises plural pixels arranged in matrix and is provided with a network of wiring associated with the pixels. The wiring 4A enclosing the display area b serves as the so-called rescue wiring to be used, for example, when a break occurs in the network of wiring extending in the display area b or in like cases.

In plan view of the pair of substrates (the liquid crystal driving substrate 1 in the figure), wiring 4A extending throughout the liquid crystal material injecting portion 2 and a region therearound is positioned closer to a peripheral edge of the pair of substrates (a peripheral edge of the liquid crystal driving substrate 1 in the figure) than the liquid crystal-sealant interface a and than wiring 4A extending in any region other than those regions. Specifically, wiring 4A positioned to extend on an extension of the liquid crystal-sealant interface a projects toward the peripheral edge of the pair of substrates to form a substantially rectangular shape extending throughout the liquid crystal material injecting portion 2 and the region therearound.

Though not shown in FIG. 1A, the liquid crystal driving substrate 1 is provided with, for example, thin film transistors (TFTs) as switching devices, an interlayer insulator and the like in addition to the wiring 4A on the internal surface thereof. Thus, in this embodiment, the liquid crystal driving substrate 1 is equal to a TFT-array substrate and the liquid crystal display device is an active-matrix drive display device.

In manufacturing the display panel of the above-described arrangement, the liquid crystal driving substrate 1 and the counter substrate are positioned to face each other with a clearance therebetween and bonded together at their peripheral portions with the adhesive layer 5. The adhesive layer 5 is formed along the periphery of the pair of substrates so as to surround the display area b except a region that will serve as the liquid crystal material injecting portion 2. Thereafter, the liquid crystal material is injected into the clearance between the two substrates through the liquid crystal material injecting portion 2, thus forming the liquid crystal material layer 6. After the formation of the liquid crystal material layer 6, the ultraviolet curing sealant 3 is injected into the liquid crystal material injecting portion 2. Further, the liquid crystal material injecting portion 2 is irradiated with ultraviolet rays from the principal plane side of one or each of the substrates so that the sealant 3 is cured. In this way the liquid crystal material injecting portion 2 is sealed.

In this arrangement, wiring 4A extending in the liquid crystal material injecting portion 2 is positioned closer to the peripheral edge of the pair of substrates than the liquid crystal-sealant interface a. For this reason, when viewed from the external surface (reverse surface of the display panel) of the substrate (the liquid crystal driving substrate 1 in this embodiment), wiring 4A fails to overlap the liquid crystal-sealant interface a and, hence, the liquid crystal-sealant interface a is not covered with wiring 4a. Accordingly, when ultraviolet rays are directed toward the liquid crystal material injecting portion 2 from the principal plane side of one or each of the substrates, the liquid crystal-sealant interface a is irradiated with the ultraviolet rays without blockage by the wiring 4A. Therefore, sealant 3 present adjacent the interface a can be cured reliably. Thus, it is possible to prevent the sealant 3 in an uncured state from contaminating the liquid crystal material layer 6, which leads to improvements in the image display characteristics and yield of the liquid crystal display device, thus rendering the liquid crystal display device highly reliable and stabilized in quality.

The liquid crystal display device according to this embodiment requires no particular limitation on the configuration of wiring extending throughout the liquid crystal material injecting portion 2 and the region therearound as long as the wiring extending throughout the liquid crystal material injecting portion 2 and the region therearound is positioned closer to the peripheral edge of the pair of substrates than wiring extending in any region other than those regions and does not cover the liquid crystal-sealant interface a by being positioned closer to the peripheral edge of the pair of substrates than the interface a in plan view.

Figure 1B:
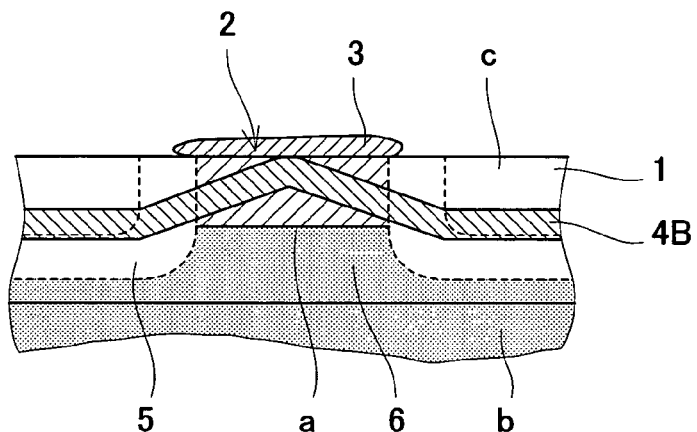

For example, FIG. 1B is a schematic enlarged fragmentary plan view showing the configuration of wiring extending in a region around the liquid crystal material injecting portion of a display panel included in a liquid crystal display device according to a variation of embodiment 1 of the present invention. A shown in FIG. 1B, wiring extending throughout the liquid crystal material injecting portion 2 and the region therearound may be wiring 4B projecting triangularly toward the peripheral edge of the pair of substrates. Alternatively, another configuration of wiring may be employed.

In each of the above-described arrangements, wiring 4A or 4B extending throughout the liquid crystal material injecting portion 2 and the region therearound is positioned to project toward the peripheral edge of the pair of substrates as described above, so as not to cover (or overlap) the liquid crystal-sealant interface a and a region therearound. The wiring 4A or 4B thus projecting toward the peripheral edge of the pair of substrates will not affect the display area b. In contrast, in the case where wiring extending throughout the liquid crystal material injecting portion 2 and the region therearound is positioned to project toward the display area b, the projecting portion, if overlapping the display area b, may affect the display. For this reason, wiring extending throughout the liquid crystal material injecting portion 2 and the region therearound is preferably projected toward the peripheral edge of the pair of substrates. In the case where wiring is projected toward the display area b, the wiring needs to be positioned so as not to affect the display.

Figure 2:
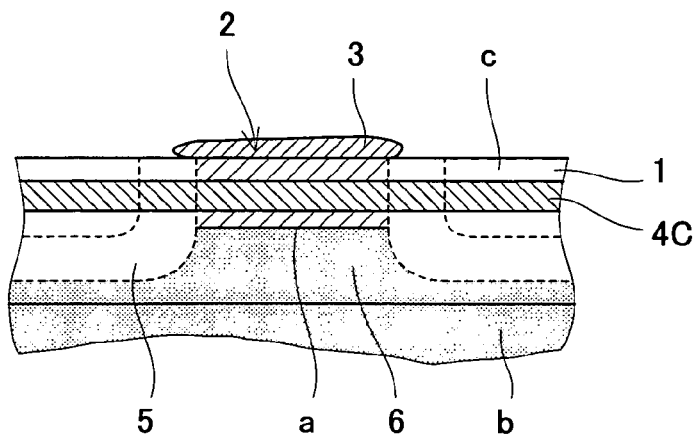
FIG. 2 is a schematic enlarged fragmentary plan view showing the configuration of wiring extending in a region around the liquid crystal material injecting portion of a display panel included in a liquid crystal display device according to a variation of embodiment 1 of the present invention.

It is possible to employ, as another variation of this embodiment, wiring 4C configured to extend over an edge on the side in which the liquid crystal material injecting portion 2 is located is wholly positioned closer to the peripheral edge of the pair of substrates than the liquid crystal-sealant interface a as shown in FIG. 2, instead of the configuration shown in FIG. 1A or 1B in which the wiring partially projects toward the peripheral edge of the pair of substrates in a region consisting of the liquid crystal material injecting portion 2 and the region therearound.

Embodiment 2

Figure 3A:
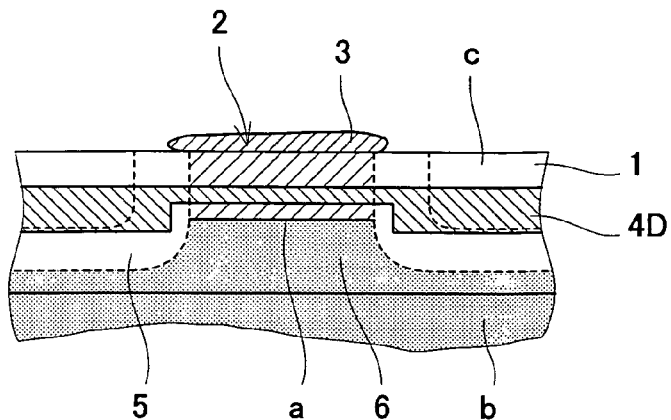
FIGS. 3A and 3B are each a schematic enlarged fragmentary plan view showing the configuration of wiring extending in a region around the liquid crystal material injecting portion of a display panel included in a liquid crystal display device according to embodiment 2 of the present invention.

FIG. 3A is a schematic enlarged fragmentary plan view showing the configuration of wiring extending in a region around the liquid crystal material injecting portion of a display panel included in a liquid crystal display device according to embodiment 2 of the present invention. Throughout FIG. 3A and FIGS. 1A and 1B, like reference characters designate like or corresponding elements.

The display panel of the liquid crystal display device according to this embodiment has the same configuration as in embodiment 1 except the following features. That is, this embodiment has wiring 4D comprising a conductive metal film, the wiring 4D being positioned not to project toward the peripheral edge of the pair of substrates in the region consisting of the liquid crystal material injecting portion 2 and the region therearound as in embodiment 1 but has a smaller line width in that region than in other region. Wiring 4D extending throughout the liquid crystal material injecting portion 2 and the region therearound and having such a decreased line width is positioned closer to the peripheral edge of the pair of substrates than the liquid crystal-sealant interface a so as not to overlap the interface a.

In this embodiment thus arranged, as in embodiment 1, the liquid crystal-sealant interface a can be irradiated with ultraviolet rays without blockage of the ultraviolet rays by wiring 4D and, hence, sealant 3 present adjacent the interface a can be cured. Therefore, the liquid crystal display device can be improved in image display characteristics and yield and rendered highly reliable and stable in quality, as in embodiment 1 described earlier. Further, since this embodiment does not need any space for the projecting portion of wiring to be positioned therein, which is needed in embodiment 1, this embodiment is more effective in frame-narrowing of liquid crystal display devices.

Figure 3B:
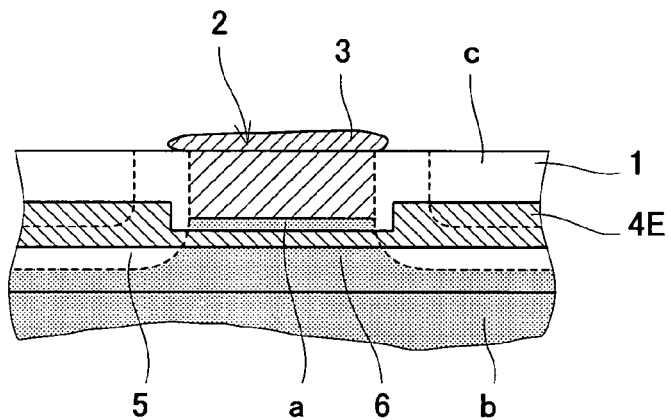

FIG. 3B is a schematic enlarged fragmentary plan view showing the configuration of wiring extending in a region around the liquid crystal material injecting portion of a display panel included in a liquid crystal display device according to a variation of embodiment 2 of the present invention. Throughout FIG. 3B and FIGS. 1A and 1B, like reference characters designate like or corresponding elements.

The display panel of the liquid crystal display device according to this embodiment has the same configuration as the display panel shown in FIG. 3A except the following features. That is, the display panel shown in FIG. 3B has wiring 4E having a decreased line width in a region consisting of the liquid crystal material injecting portion 2 and a region therearound, the thinner wiring 4E being positioned closer to the display area b than the liquid crystal-sealant interface a so as not to overlap the interface a in plan view.

Since the wiring 4E, which is basically positioned so as not to affect the display, has a decreased line width in the aforementioned region according to this embodiment, the thinner portion of wiring 4E, even when positioned closer to the display area b than the liquid crystal-sealant interface a, has no possibility of affecting the display as in embodiment 1. The portion of wiring, which is narrowed in the liquid crystal material injecting portion 2, may be positioned on either side, the substrate peripheral edge side or the display area b side. Further, there is no particular limitation on the position of the narrowed wiring portion on either side.

Embodiment 3

Figure 4:
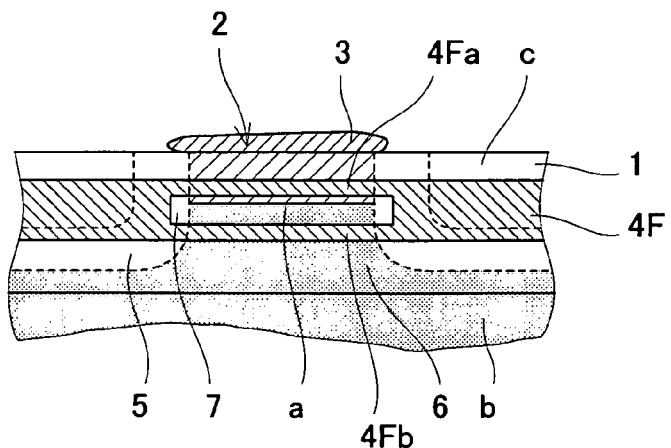
FIG. 4 is a schematic enlarged fragmentary plan view showing the configuration of wiring extending in a region around the liquid crystal material injecting portion of a display panel included in a liquid crystal display device according to embodiment 3 of the present invention.
Figure 5:
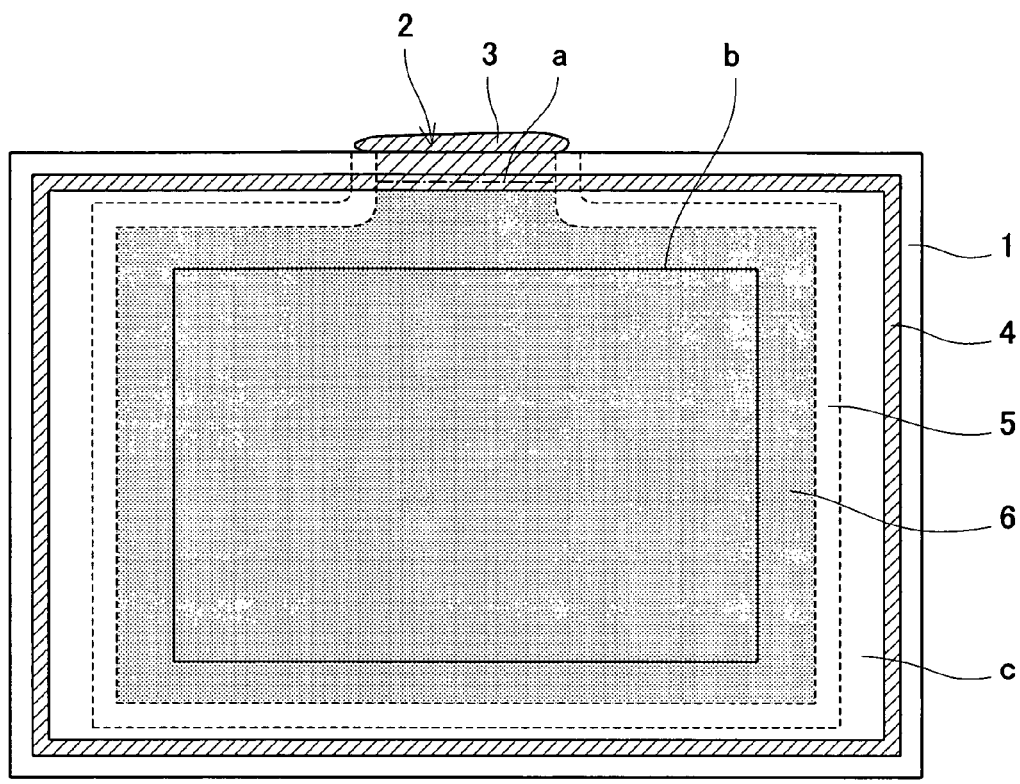
FIG. 5 is a schematic plan view showing the arrangement of a display panel included in a conventional liquid crystal display device of a frame-narrowing design.

FIG. 4 is a schematic enlarged fragmentary plan view showing the configuration of wiring extending in a region around the liquid crystal material injecting portion of a display panel included in a liquid crystal display device according to embodiment 3 of the present invention. Throughout FIG. 4 and FIGS. 1A and 1B, like reference characters designate like or corresponding elements.

The display panel of the liquid crystal display device according to this embodiment has the same configuration as in embodiment 1 except the following features. That is, this embodiment has wiring 4F branched to extend around the liquid crystal-sealant interface a in a region consisting of the liquid crystal material injecting portion 2 and a region therearound, thus forming detouring branch lines 4Fa and 4Fb and a rectangular opening 7 defined between these lines 4Fa and 4Fb. For the liquid crystal-sealant interface a to be located within the opening 7 in plan view, the branch line 4Fa is positioned closer to the substrate peripheral edge than the liquid crystal-sealant interface a while the branch line 4Fb positioned closer to the display area b than the liquid crystal-sealant interface a. The branch lines 4Fa and 4Fb extend over the liquid crystal material injecting portion 2 and the region therearound and then join together again into single wiring 4F.

Since wiring 4F, which is basically positioned so as not to affect the display, is branched to extend over the liquid crystal material injecting portion 2 and the region therearound in this embodiment, the branch line 4Fb, even when positioned closer to the display area b than the liquid crystal-sealant interface a, has no possibility of affecting the display as in embodiment 1.

In this embodiment thus arranged, the liquid crystal-sealant interface a can be irradiated with ultraviolet rays through the opening 7 without blockage of the ultraviolet rays by wiring 4F (branch lines 4Fa and 4Fb). Hence, sealant 3 present adjacent the interface a can be cured. Therefore, the liquid crystal display device can be improved in image display characteristics and yield and rendered highly reliable and stable in quality, as in embodiment 1 described earlier. Further, since this embodiment does not need any space for the projecting portion of wiring to be positioned therein, which is needed in embodiment 1, this embodiment is more effective in frame-narrowing of liquid crystal display devices.

Though there is no particular limitation on the positions of the respective branch lines and the shape of the opening, it is preferable to make designs so as not to affect the display while facilitating the frame-narrowing. While the embodiment in which wiring 4F is branched into two lines has been described here, the wiring may be branched into two or more as long as the liquid crystal-sealant interface a is located within an opening defined between branch lines.

In any one of embodiments 1 to 3, description has been directed to the case where only the internal surface of the liquid crystal driving substrate is provided with wiring. However, an arrangement may be employed in which wiring is provided on the internal surface of the counter substrate or on the internal surfaces of both of the liquid crystal driving substrate and the counter substrate.

In any one of embodiments 1 to 3, description has been directed to the active-matrix drive liquid crystal display device including the liquid crystal driving substrate provided with switching devices. However, the present invention is applicable to passive-matrix drive liquid crystal display devices.

As has been described above, the liquid crystal display device of the present invention has the arrangement in which wiring formed by providing a conductive metal film on the internal surface of a substrate forming part of the display panel is positioned so as not to cover the interface at which the liquid crystal material and the ultraviolet curing sealant contact each other in a plan view from the principal plane side of the substrate. For example, the wiring may be positioned closer to the substrate peripheral edge than the interface. Alternatively, the wiring may be branched to extend around the interface and a region therearound. Further alternatively, the wiring may have a smaller line width in a region consisting of the interface and the region therearound than in other region. Such configurations each allow the interface to be irradiated with ultraviolet rays without blockage by the wiring when the ultraviolet curing sealant injected into the liquid crystal material injecting portion is irradiated with the ultraviolet rays. For this reason, it is possible to inhibit the sealant in an uncured state to contact and contaminate the liquid crystal material. It is, therefore, possible to realize a liquid crystal display device which realizes favorable image display, offers an improved yield and ensures stabilized quality in reliability and the like. Thus, the present invention is of great industrial value.

It will be apparent from the foregoing description that many improvements and other embodiments of the present invention occur to those skilled in the art. Therefore, the foregoing description should be construed as an illustration only and is provided for the purpose of teaching the best mode for carrying out the present invention to those skilled in the art. The details of the structure and/or the function of the present invention can be modified substantially without departing from the spirit of the present invention.

INDUSTRIAL APPLICABILITY

As described above, the liquid crystal display device according to the present invention is useful as a display device reduced in thickness and size for use in AV equipment products, OA equipment products, communication equipment products and like products.

The invention claimed is:

1. A liquid crystal display device comprising:
   a pair of substrates disposed with respective principal planes thereof facing each other to define a clearance therebetween, at least one of the substrates being provided with wiring on an internal surface thereof;
   a liquid crystal material layer comprising a liquid crystal material filling the clearance between the pair of substrates;
   an adhesive layer enclosing the liquid crystal material layer except a gap as a liquid crystal material injecting portion in the clearance; and
   a light curing sealant sealing the liquid crystal material injecting portion,
   wherein in a plan view of the pair of substrates, the wiring overlaps with the sealant at the liquid crystal material injecting portion, and has a window that exposes an entire interface between the liquid crystal material layer and the sealant at the liquid crystal material injecting portion.

2. The liquid crystal display device according to claim 1, wherein the wiring is made of conductive metal material.

3. The liquid crystal display device according to claim 1, wherein the wiring is rescue wiring.

4. The liquid crystal display device according to claim 1, wherein said at least one of the substrates includes switching devices.

5. The liquid crystal display device according to claim 1, wherein the wiring is made of light blocking material.

6. The liquid crystal display device according to claim 1, wherein the wiring is rescue wiring made of light blocking material.

7. The liquid crystal display device according to claim 1, wherein the wiring is rescue wiring made of light blocking material, and said at least one of the substrates includes switching devices and a network of wiring.

* * * * *